United States Patent
Hartikainen

(10) Patent No.: US 7,895,597 B2
(45) Date of Patent: Feb. 22, 2011

(54) METHOD, APPARATUS AND COMPUTER PROGRAM PRODUCT ENABLING FULL PRE-EMPTIVE SCHEDULING OF GREEN THREADS ON A VIRTUAL MACHINE

(75) Inventor: Vesa-Matti Mikael Hartikainen, Tampere (FI)

(73) Assignee: Nokia Corporation, Espoo (FI)

( * ) Notice: Subject to any disclaimer, the term of this patent is extended or adjusted under 35 U.S.C. 154(b) by 1487 days.

(21) Appl. No.: 11/248,896

(22) Filed: Oct. 11, 2005

(65) Prior Publication Data
US 2007/0061791 A1    Mar. 15, 2007

Related U.S. Application Data

(60) Provisional application No. 60/718,012, filed on Sep. 15, 2005.

(51) Int. Cl.
G06F 9/46 (2006.01)
(52) U.S. Cl. ........................... 718/108
(58) Field of Classification Search ........... 718/1, 718/108
See application file for complete search history.

(56) References Cited

U.S. PATENT DOCUMENTS

| | | | | |
|---|---|---|---|---|
| 4,099,237 A | * | 7/1978 | Zitelli et al. | 700/290 |
| 5,692,193 A | * | 11/1997 | Jagannathan et al. | 718/106 |
| 5,862,400 A | * | 1/1999 | Reed et al. | 712/34 |
| 5,930,820 A | * | 7/1999 | Lynch | 711/132 |
| 7,117,397 B1 | * | 10/2006 | Kondo et al. | 714/48 |
| 7,475,002 B1 | * | 1/2009 | Mann | 703/23 |
| 2002/0010733 A1 | * | 1/2002 | Baba et al. | 709/108 |
| 2003/0217087 A1 | * | 11/2003 | Chase et al. | 709/1 |
| 2004/0133891 A1 | | 7/2004 | Dahlstedt et al. | 718/100 |
| 2005/0262389 A1 | * | 11/2005 | Leijten | 714/6 |
| 2006/0026407 A1 | * | 2/2006 | Chauvel | 712/228 |

* cited by examiner

Primary Examiner—Li B Zhen
Assistant Examiner—Blake Kumabe
(74) Attorney, Agent, or Firm—Harrington & Smith

(57) ABSTRACT

Disclosed is a computer program product, a method and a device to execute a native code thread in a virtual machine environment. The method includes, prior to executing the native code thread, storing a pointer pointing to a current top of a native stack; initiating generation of an interrupt; beginning execution of the native code thread; upon an occurrence of the interrupt, determining if the native code thread is still executing and, if it is; recording a current status of the native code thread; interrupting execution of the native code thread; and when returning to execute the interrupted native code thread, retrieving the stored state of the native code thread.

26 Claims, 3 Drawing Sheets

US 7,895,597 B2

METHOD, APPARATUS AND COMPUTER PROGRAM PRODUCT ENABLING FULL PRE-EMPTIVE SCHEDULING OF GREEN THREADS ON A VIRTUAL MACHINE

CLAIM OF PRIORITY FROM COPENDING PROVISIONAL PATENT APPLICATION

This patent application claims priority under 35 U.S.C. §119(e) from Provisional Patent Application No. 60/718,012, filed Sep. 15, 2005, the disclosure of which is incorporated by reference herein in its entirety.

TECHNICAL FIELD

The teachings in accordance with the exemplary embodiments of this invention relate generally to data processing systems and methods, and more specifically relate to execution of code in a virtual machine (VM) environment, including virtual machines implemented in mobile devices, such as a mobile communications devices.

BACKGROUND

Certain VMs, and Java™ VMs (JVMs) in particular, have provided a technique to allow third party applications to operate on mobile devices, such as mobile telephones. In some cases the VMs do not operate as interpreters, but instead execute native code.

By way of introduction, "bytecodes" are the machine language of the JVM. When a JVM loads a class file, it obtains one stream of bytecodes for each method in the class. The bytecodes streams are stored in a method area of the JVM. The bytecodes for a method are executed when that method is invoked during the course of running the program. They can be executed by interpretation, by just-in-time (JIT) compilation, or any other suitable technique A method's bytecode stream is a sequence of instructions for the JVM. Each instruction consists of a one-byte opcode followed by zero or more operands. The opcode indicates the action to be taken take. If more information is required before the JVM can take the action, that information is encoded into one or more operands that immediately follow the opcode. Each type of opcode has a mnemonic. In the typical assembly language style, streams of Java bytecodes can be represented by their mnemonics followed by any operand values. The bytecode instruction set was designed to be compact. All instructions, except two that deal with table jumping, are aligned on byte boundaries. The total number of opcodes is sufficiently small that opcodes occupy only one byte. All computation in the JVM centers on the stack. Because the JVM has no registers for storing arbitrary values, everything must be pushed onto the stack before it can be used in a calculation. Bytecode instructions therefore operate primarily on the stack.

Both "green" and "native" threads are mechanisms to support multi-threaded execution of Java™ programs. Certain JVM distributions include an option to run with either type of threading (JVM can be obtained as part of a Java Development Kit (JDK), or as part of a Java Runtime Environment (JRE)). Native threads use the operating system's native ability to manage multi-threaded processes and, in particular, they use the pthread library. When running with native threads, the kernel schedules and manages the various threads that make up the process.

In contradistinction to native threads, green threads emulate multi-threaded environments without relying on native OS threading capabilities. Green threads run code in a user space that manages and schedules threads. Green threads are useful for enabling Java™ to operate in environments that do not have native thread support.

Differences between native and green threads that arise in a Linux™ environment include the following. Native threads can switch between threads preemptively, switching control from a running thread to a non-running thread at any time. In cooperative threading, threads only switch when control is explicitly given up by a thread (Thread.yield( ), Object.wait ( ), etc.), or when a thread performs a blocking operation (read( ), etc.). In general, if green threads are executing and the are interpreted the VM can schedule threads between executing two bytecodes. However, if green threads are executing native code then thread execution can be interrupted only at the mentioned points. In addition, on multi-CPU machines, native threads can run more than one thread simultaneously by assigning different threads to different CPUs. Green threads run on only one CPU. Further, native threads create the appearance that many Java processes are running as each thread takes up its own entry in the process table.

The use of green threads implies that the VM implements the threads and schedules them. However, when using green threads full preemption has not been possible with native code. Native code can be either code called with a native interface, such as JNI (Java Native Interface), or code generated by a JIT, a Dynamic Adaptive Compiler (DAC), or an Ahead of Time compiler (AOT). Although in some parts of an application the multitasking may be pre-emptive, in those parts where native code is used the multitasking is either lacking or is cooperative.

It is noted that the DAC is a runtime compiler, as is JIT. One distinction between JIT and DAC is that JIT compiles all methods, whereas DAC profiles the executable code and only compiles the most-often used methods. For the purposes of this description both may be referenced simply as runtime compilers.

When the VM is using green threads, typically the VM scheduler schedules the threads after interpreting some number of bytecodes. When bytecodes need to access system services then typically native code is needed for accessing services offered by the native platform. In Java™ this native code can be used through JNI. The performance of the VM can be accelerated by compiling the most frequently used methods to native code and then executing the native code.

However, a problem that arises with native code and green threads is that the VM does not have control over the native code while it is executing. Multi-threading with green threads is only pre-emptive while executing in an interpreted mode. This means, for example, that the presence of an infinite loop in native code could prevent all other threads from executing.

One potential strategy in VMs is to use native threads instead of green threads, since the scheduling is done by the operating system (OS) and not the VM. This makes the preemption the responsibility of the operating system.

Another option is to instrument the native code with checks as to whether it should yield to thread scheduling. However, this technique requires additional coding complexity.

SUMMARY OF THE EXEMPLARY EMBODIMENTS

The foregoing and other problems are overcome, and other advantages are realized, in accordance with the non-limiting and exemplary embodiments of this invention.

In certain exemplary and non-limiting aspects of this invention there are provided a computer program product, a method, a device and a system to execute a native code thread in a virtual machine environment. The method includes, prior to executing the native code thread, storing a pointer pointing to a current top of a stack; initiating generation of an interrupt; beginning execution of the native code thread; upon an occurrence of the interrupt, determining if the native code thread is still executing and, if it is; recording a state of the native code thread; interrupting execution of the native code thread and when returning to execute the interrupted native code thread, retrieving the stored state of the native code thread.

Further in accordance with exemplary embodiments of this invention there is provided a virtual machine that includes timer means for determining when to force a running green thread that is executing native code to yield to scheduling means for enabling preemptive scheduling when the virtual machine is running in a non-interpreted green thread mode.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

Figure 1:
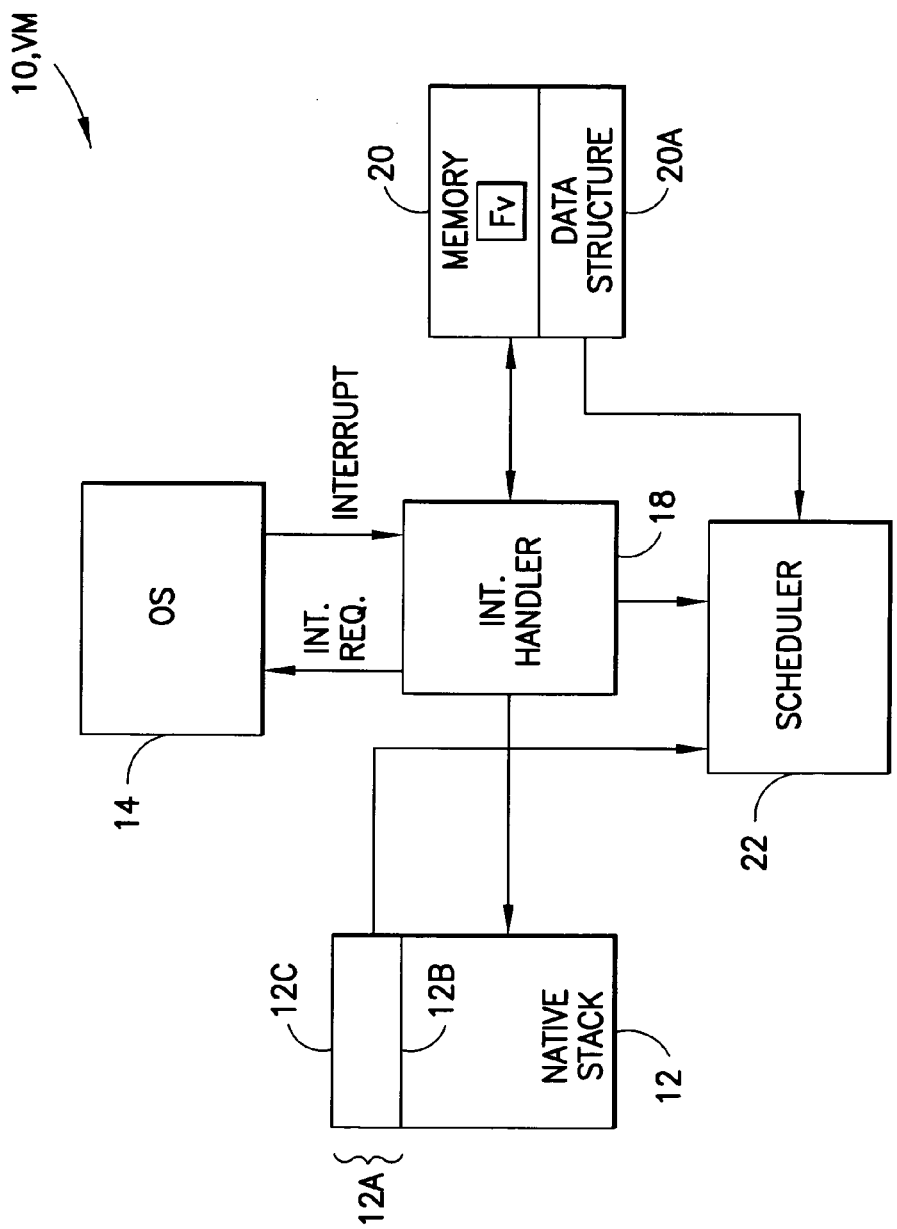
FIG. 1 is a block diagram of a virtual machine in accordance with an exemplary embodiment of this invention.

Referring to FIG. 1, and in accordance with non-limiting embodiments of this invention, when entering native code a VM 10 stores a pointer pointing to the current top of a native stack 12, and creates and requests a timed interrupt (INT REQ) from an OS 14. If the native code executes for longer than the time requested for the interrupt, the timed interrupt arrives while the native code is still executing. At this time an interrupt handler 18 records the status of the native thread and stores the status (state) in a data structure 20A in a memory 20. Next the interrupt handler 18 calls a scheduler 22. When returning to execute the interrupted native code the scheduler 22 retrieves the stored state of the thread from the data structure 20A of the memory 20. The time value used when requesting timed interrupts may be a constant or, in some exemplary embodiments of this invention, it may be made a variable.

More specifically, before the VM 10 enters the native code it stores a pointer to mark the top of the native stack 12 so that it can distinguish which part of the native stack 12 belongs to the native code it is about to execute. Then the VM 10 requests the timed interrupt from the OS 14. After these operations are completed the native code can be executed.

The top part 12A of the native code stack 12 is that portion between a previously marked top 12B and a current top 12C. The state of the native code stack (the top part 12A) is stored in the data structure 20A, which may also contain other information concerning the native thread, such as the thread_id, the thread priority, and any other information of interest. After the state of the native code thread has been stored (after the top part 12A of the stack 12 has been saved in the data structure 20A), the scheduler 22 can be called. When the scheduler 22 needs to return to the interrupted native code thread, the state of the interrupted native code thread can be restored by pushing the saved information from the data structure 20A back onto the top part 12A of the native stack 12, and setting processor register values accordingly.

The native code may be compiled from bytecode by the JIT, or the AOT, or by a DAC, referred to collectively hereafter for simplicity as JIT code, or by code invoked through a native interface, such as JNI (referred to hereafter as JNI code). JNI, or Java Native Interface, refers to writing C/C++/assembler code native methods callable from Java™. JNI also enables C/C++ code to call Java methods.

One problem that arises with JIT code and native threads is that the thread can only be interrupted in a safe place. More specifically, JIT code may compile one bytecode to several native instructions, and an interruption may occur while some of the instructions that implement a given bytecode have been executed while others have not. This situation can cause a problem when data common with other threads is being manipulated or read. Bytecodes that access the Java™ heap fall into this category, as can bytecodes that access other common data structures in the VM 10. As is known, in heap-based memory allocation the memory is allocated dynamically from a large pool of unused memory area (referred to as the heap). Space requirement is calculated during allocation at runtime and an allocated memory area's life cycle does not depend on the procedure entry/exit. The allocated area is reached indirectly, by pointers or their equivalent (such as by reference variables in Java™).

When using native threads with JIT the protection can be implemented using OS synchronization structures. However, this technique is not applicable to the situation of most interest to the invention, as it is preferred that only one native thread is used at any given time. Thus, it is important to ensure that certain bytecodes can be executed atomically (without interruption).

There are several possible techniques for ensuring that bytecodes execute atomically. One non-limiting technique, which is the simplest to implement, uses the native code generator to indicate that a critical section has been entered. This can be accomplished with a thread-specific flag variable (FV) that is set when entering critical code and then subsequently released (reset) when exiting the critical code. The FV can be stored in the memory 20, or in any suitable storage location. The interrupt handler 18 may determine from the state of the FV that the thread must be allowed to continue execution. It should be noted, however, that a significant number of bytecodes operate on the stack, which is thread specific. Therefore, most of these operations are not required to be atomic. It is also likely that calling methods and returning methods need to use critical sections of code in order to maintain garbage collection root information valid at all times. Other techniques for ensuring that bytecodes execute atomically may also be employed, either alone or in combination with the thread-specific FV technique.

The same issues can arise with JNI code and native threads, as certain upcalls (and downcalls) from JNI code need to be atomic. The reasons are basically the same as with JIT code, i.e., the common data structures need to be accessed in an atomic manner in order to obtain logically consistent values. For JNI code the safe code points may be marked in same way as with JIT code, discussed above.

A discussion is now made of interrupt handling. When the previously requested interrupt occurs, it is desirable to verify whether the VM 10 is in the interpreting mode, or whether the system is (still) executing the native code. If it is determined that the system is still executing the native code, then a check is made as to whether the thread can be stopped, that is, that the state of the thread is safe. The above-mentioned use of the FV can be useful for this purpose. If the thread can be interrupted the state of the thread is then saved. The state of the thread may include the Java stack, the top part 12A of the native stack 12 (the part above the basic interpretation loop), and the values of processor registers. The pointer stored when entering the native thread call indicates the bottom 12B of the stack 12, while the current stack top 12C is the top of the saved part 12A. After saving the thread state, the scheduler 22 is invoked by the interrupt handler 18.

If the thread is not on a safe point then it remains active, and a new timed interrupt is requested from the interrupt handler 18. The time value used may be the one used previously, or a different time value may be employed (e.g., one less than the previous value).

The exemplary embodiments of this invention allow mixed mode scheduling, where interrupts are used where needed and the conventional techniques are used otherwise. Also, a purely interrupt-based approach may be used. The scheduler 22 can be invoked either from the interrupt, in accordance with an aspect of this invention, or in a conventional manner from the interpretation loop after some certain number of bytecodes are executed. If the scheduler 22 is to invoke a thread that was previously put to sleep (suspended) by the generation of the interrupt, then the scheduler 22 needs also to load the state of the native stack 12 before executing the thread. In the case where the scheduler 22 wakes up a thread that was put to sleep in a conventional (non-interrupt) manner, then only the Java stack needs to be loaded.

The use of this invention avoids the need to instrument native code, which would consume more memory and typically will run more slowly.

Figure 2:
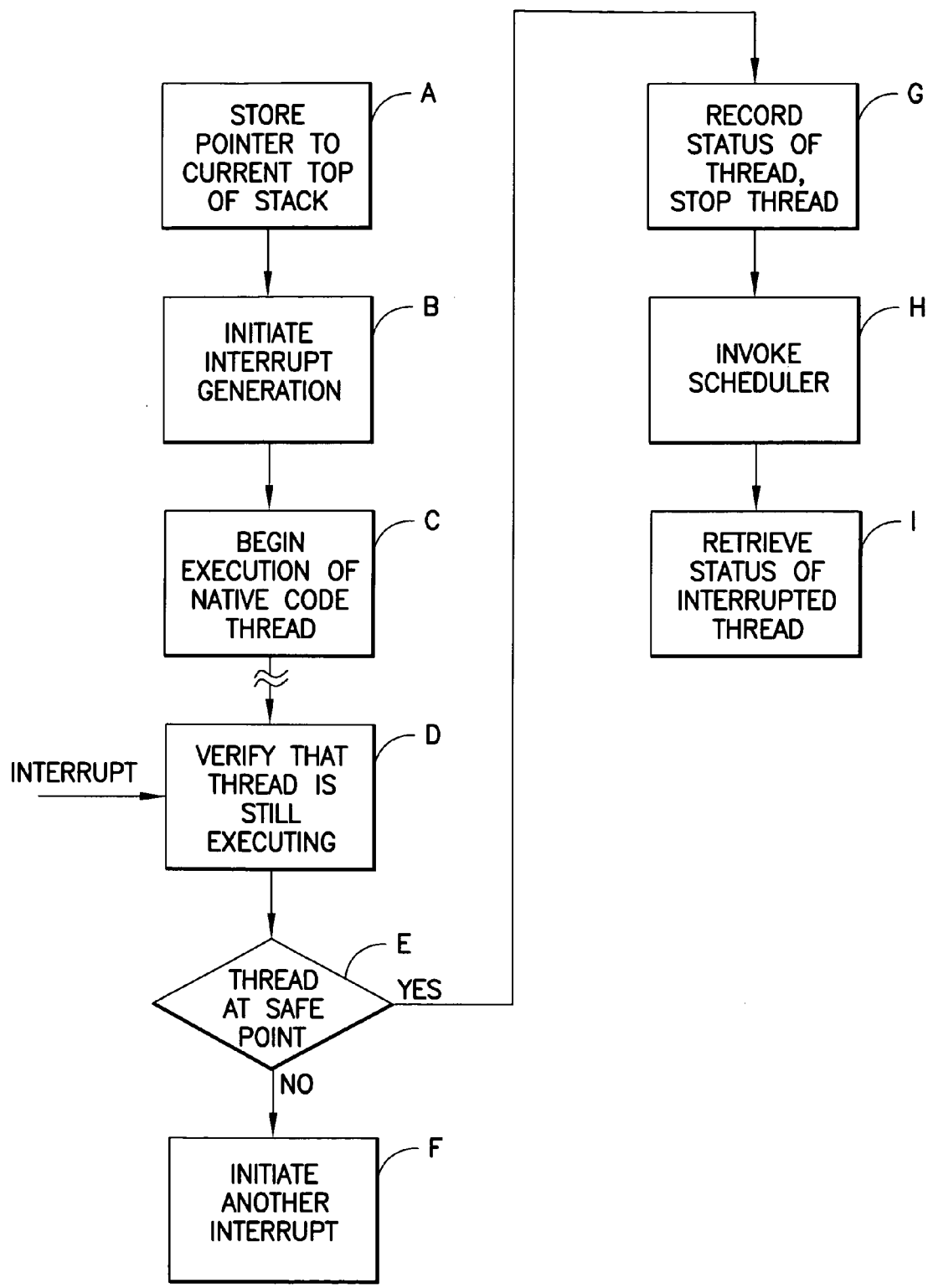
FIG. 2 is a logic flow diagram that depicts a method in accordance with an exemplary embodiment of this invention.

Referring to FIG. 2, in accordance with an exemplary embodiment of a method in accordance with this invention to execute a native code thread in a virtual machine environment, performing at Step A, prior to executing the native code thread, storing a pointer pointing to a current top of a native stack 12; initiating generation of an interrupt (Step B); beginning execution of the native code thread (Step C); upon an occurrence of the interrupt, determining if the native code thread is still executing (Step D) and, if it is; determining if the thread is at a safe point where it can be stopped (Step E). If it is not, then the thread remains running and another timed interrupt is initiated (Step F). If the thread is at a safe point, then the method continues by recording a current status of the native code thread and interrupting execution of the native code thread (Step F); invoking the thread scheduler 22 (Step G) and, when returning to execute the interrupted native code thread, retrieving the stored state of the native code thread (Step H).

Note that the thread may be suspended at Step G by the interrupt handler 18, such that when the scheduler 22 is invoked the stack 12 has been cleared of the current thread state (portion 12A). However, it is also within the scope of this invention to permit the scheduler 22 to suspend the thread state at Step H.

In Step B it may be preferred that the interrupt period be made considerably longer than the entire task of switching threads in the Virtual Machine 10, as otherwise the cost of switching threads may become excessive. The specific value thus can depend on the overall performance of the VM 10, and on a device where the VM 10 is implemented. Further, the scheduling algorithm 22 may desire to adjust the interrupt period depending on thread priorities and other run-time information. As a non-limiting example, it can be shown that, with regard to scheduling in a Linux™ kernel, interactive programs should have response times of between about 50 ms and 150 ms. Thus, in order to achieve these response times it may be assumed that the interrupt period should be comparable. As such, in an exemplary embodiment of this invention the requested interrupt period in Step B of FIG. 2 may be about 100 ms, and this value may be subject to change during operation of the VM 10.

Figure 3:
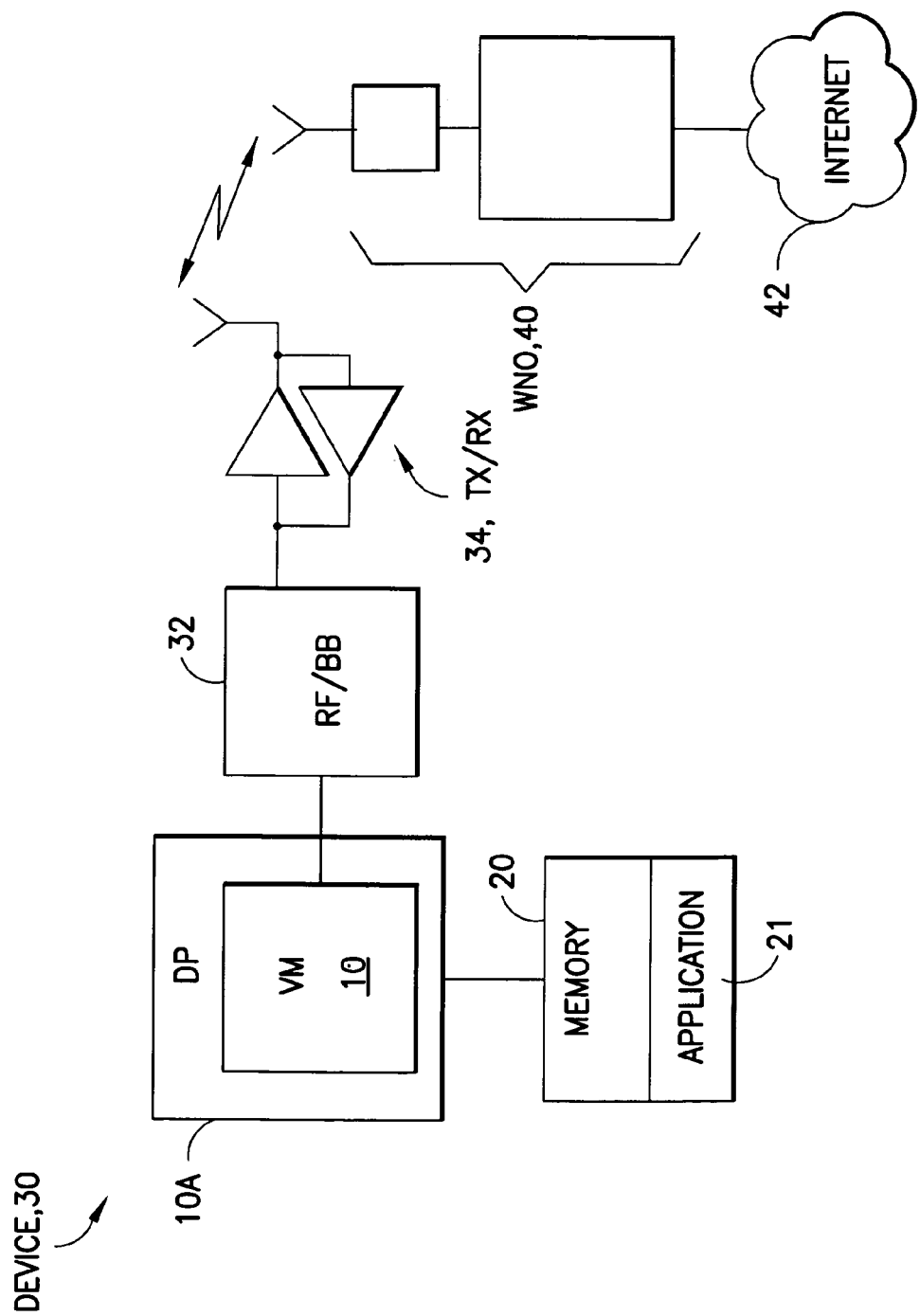
FIG. 3 is a block diagram that illustrates the virtual machine of FIG. 1 embodied in a device, such as a mobile communications device.

FIG. 3 shows an exemplary embodiment of the VM 10 as shown in FIG. 1 embodied in a device 30, such as a mobile communications device, also referred to as a mobile node or a mobile station. There is assumed to be at least one data processor (DP) 10A that is assumed to implement the operation of the VM 10, as well as possibly other functions of the device 30. The device 30 also includes, in this non-limiting embodiment, a radio frequency/baseband (RF/BB) portion 32, that may be implemented with a digital signal processor (DSP) and/or dedicated or programmable logic circuits, and a RF transceiver 34 for communication with external devices and/or networks, such as a wireless network operator (WNO) 40. The WNO 40 may provide a link to local area network(s) and/or wide area data communication networks, such as the Internet 42. The memory 20 may include at least one application 21 that is executable by the VM 10.

In general, the various embodiments of the device 30 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Other devices embodying the exemplary embodiments of this invention may not have wireless communication capabilities.

The exemplary embodiments of this invention may be implemented by computer software executable by a data processor of the device 30, or by hardware, or by a combination of software and hardware. Further in this regard it should be noted that the various blocks of the logic flow diagram of FIG. 2 may represent program steps, or interconnected logic circuits, blocks and functions, or a combination of program steps and logic circuits, blocks and functions.

The memory 20 may be of any type suitable to the local technical environment and may be implemented using any suitable data storage technology, such as semiconductor-based memory devices, magnetic memory devices and systems, optical memory devices and systems, fixed memory and removable memory. The data processor(s) 10A may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As can be appreciated in view of the foregoing description, exemplary aspects of this invention enable the use of a timer-based technique to determine when to force a running green thread that is executing native code to yield to scheduling, thereby enabling preemptive scheduling when a VM is running in a non-interpreted green thread mode.

The foregoing has provided by way of exemplary and non-limiting embodiments a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method comprising:
   prior to executing a native code thread in a virtual machine environment comprised of at least one virtual machine that is running in a non-interpreted green thread mode, storing a pointer pointing to a current top of a stack;
   initiating an interrupt generator to generate an interrupt;
   beginning execution of the native code thread, the stack being used during execution of the native code thread by the virtual machine; and
   upon an occurrence of the interrupt generated by the interrupt generator, determining if the native code thread is still being executed by the virtual machine and, if it is, verifying that the executing native code thread can be safely interrupted and, only if it is verified that execution of the native code thread can be safely interrupted;
   recording a state of the native code thread comprising saving a top portion of the stack in a memory, the top portion of the stack comprising a portion above the point indicated by the stored pointer and being the portion of the stack used during the execution of the native code thread by the virtual machine;
   interrupting execution of the native code thread by the virtual machine; and
   when returning to continue to execute the interrupted native code thread, retrieving the stored state of the native code thread by reading the saved top portion of the stack from the memory and placing it back on the top of the stack.

2. The method of claim 1, where verifying comprises testing a value of a flag.

3. The method of claim 1, where the native code thread is comprised of compiled code.

4. The method of claim 1, where interrupting execution of the native code thread is performed by an interrupt handler.

5. The method of claim 1, where interrupting execution of the native code thread is performed by a scheduler that is invoked by an interrupt handler.

6. The method of claim 1, where if it is determined that the executing native code thread cannot be safely interrupted, the method further comprises initiating the interrupt generator to generate another interrupt.

7. A non-transitory computer readable medium that stores computer program instructions, execution of the instructions by a computer operable to execute a native code thread in a virtual machine environment comprising operations of:
   prior to executing the native code thread by a virtual machine that is running in a non-interpreted green thread mode, storing a pointer pointing to a current top of a native stack;
   initiating an interrupt generator to generate an interrupt;
   beginning execution of the native code thread, the native stack being used during execution of the native code thread by the virtual machine; and
   upon an occurrence of the interrupt generated by the interrupt generator, determining if the native code thread is still being executed by the virtual machine and, if it is, verifying that the executing native code thread can be safely interrupted and, only if it is verified that execution of the native code thread can be safely interrupted;
   recording a current state of the native code thread comprising saving a top portion of the native stack in a memory, the top portion of the native stack comprising a portion above the point indicated by the stored pointer and being the portion of the native stack used during the execution of the native code thread by the virtual machine;
   interrupting execution of the native code thread by the virtual machine; and
   when returning to continue to execute the interrupted native code thread, retrieving the stored state of the native code thread by reading the saved top portion of the native stack from the memory and placing it back on the top of the native stack.

8. The non-transitory computer readable medium of claim 7, where the verifying operation comprises testing a value of a flag.

9. The non-transitory computer readable medium of claim 7, where the native code thread is comprised of compiled code.

10. The non-transitory computer readable medium of claim 7, where the operation of interrupting execution of the native code thread is performed by an interrupt handler.

11. The non-transitory computer readable medium of claim 7, where the operation of interrupting execution of the native code thread is performed by a scheduler that is invoked by an interrupt handler.

12. The non-transitory computer readable medium of claim 7, where if it is determined that the executing native code thread cannot be safely interrupted, further comprising an operation of initiating the interrupt generator to generate another interrupt.

13. The non-transitory computer readable medium of claim 7, where the operation of initiating the interrupt generator to generate an interrupt comprises requesting generation of an interrupt after a period of time that is greater than a time required to switch between threads in the virtual machine environment.

14. An apparatus, comprising:
at least one data processor,
a memory,
an interrupt generator and
an interrupt handler,
said data processor operating under control of a stored program to execute a native code thread by a virtual machine that is running in a non-interpreted green thread mode in a virtual machine environment and configured to, prior to executing the native code thread, store in said memory a pointer pointing to a current top of a stack; initiate operation of said interrupt generator to generate an interrupt; begin execution of the native code thread, where the stack is used during execution of the native code thread by the virtual machine; and upon an occurrence of an interrupt generated by the interrupt generator, determine if the native code thread is still being executed by the virtual machine and, if it is; verify that the executing native code thread can be safely interrupted and, only if it is verified that execution of the native code thread can be safely interrupted; record a status of the native code thread comprising saving a top portion of the stack in said memory, the top portion of the stack comprising a portion above the point indicated by the stored pointer and being the portion of the stack used during the execution of the native code thread by the virtual machine; interrupt execution of the native code thread by the virtual machine and, when the virtual machine subsequently returns to continue to execute the interrupted native code thread retrieve the stored status of the native code thread from said memory by reading the saved top portion of the stack from said memory and placing it back on the top of the stack.

15. The apparatus of claim 14, where verifying comprises testing a value of a flag stored in said memory.

16. The apparatus of claim 14, where the native code thread is comprised of compiled code.

17. The apparatus of claim 14, where interrupting execution of the native code thread is performed by said interrupt handler.

18. The apparatus of claim 14, further comprising a scheduler, where interrupting execution of the native code thread is performed by said scheduler.

19. The apparatus of claim 14, further comprising a wireless transceiver for conducting communications with at least one of another apparatus comprising a wireless transceiver or a wireless network.

20. A system, comprising:
a device having a wireless transceiver for conducting communications with at least one of another device or a network and further comprising
at least one data processor,
a memory,
an interrupt generator and
an interrupt handler,
said data processor operating under control of a stored program to execute a native code thread in a virtual machine environment with a virtual machine that is running in a non-interpreted green thread mode, comprising operations of, prior to executing the native code thread, storing in said memory a pointer pointing to a current top of a stack; initiating operation of said interrupt generator to generate an interrupt at some future time; beginning execution of the native code thread, the stack being used during execution of the native code thread by the virtual machine; and upon an occurrence of the interrupt, determining if the native code thread is still executing and, if it is, verifying that the executing native code thread can be safely interrupted and, only if it is verified that execution of the native code thread can be safely interrupted; recording a status of the native code thread comprising saving a top portion of the stack in said memory, the top portion of the stack comprising a portion above the point indicated by the stored pointer and being the portion of the stack used during the execution of the native code thread by the virtual machine; interrupting execution of the native code thread by the virtual machine and, when subsequently returning to execute the interrupted native code thread, retrieving the stored status of the native code thread from said memory by reading the saved top portion of the stack from said memory and placing it back on the top of the stack.

21. The system of claim 20, where if it is determined that the executing native code thread cannot be safely interrupted, further comprising an operation of initiating the interrupt generator to generate another interrupt.

22. An apparatus, comprising:
a processor; and
a memory including computer program code, where the memory and computer program code are configured to, with the processor, cause the apparatus to implement a virtual machine configured to perform preemptive scheduling when the virtual machine is running in a non-interpreted green thread mode, said virtual machine further configured to force a running green thread that is executing native code to halt execution of the native code only at a safe point, and to save state of the halted native code for later use when a scheduler initiates execution of the halted native code, where said virtual machine comprises a native stack and is configured, when initiating execution of the native code of the green thread, to store a pointer that points to a current top of the native stack, and when halting execution of the native code at the safe point, to save the state of the native code by storing a top portion of the native stack in said memory, the top portion of the native stack comprising a portion above the point indicated by the stored pointer and being the portion of the native stack used during the execution of the native code by the virtual machine, said virtual machine being further configured to subsequently retrieve the stored state of the native code by reading the saved top portion of the native stack from said memory and writing the read top portion back to the top of the native stack.

23. The apparatus of claim 22, where said virtual machine comprises an interrupt generator and is further configured to determine if the native code is at the safe point in response to an occurrence of an interrupt that is generated after a first predetermined period established by the interrupt generator being programmed to generate the interrupt when said scheduler first initiates execution of the native code of the green thread, and where said virtual machine is further configured, if it is determined that the native code is not at a safe point, to not halt execution of the native code of the running green thread and to program the interrupt generator to generate another interrupt after a second predetermined period.

24. The apparatus of claim 23, where the second predetermined period is equal to or different than the first predetermined period, and where the first predetermined period is an amount of time than is greater than an amount of time required by said virtual machine to switch execution from one thread to another thread.

25. The apparatus of claim 22, where the safe point is a point that ensures that a bytecode is executed atomically.

26. The apparatus of claim 22, embodied in a device that comprises wireless communication circuitry.

* * * * *